US012743209B2

(12) United States Patent
Confalonieri et al.

(10) Patent No.: US 12,743,209 B2
(45) Date of Patent: Sep. 22, 2026

(54) CONTROLLER ARCHITECTURE FOR RELIABILITY, AVAILABILITY, SERVICEABILITY ACCESS

(71) Applicant: Micron Technology, Inc., Boise, ID (US)

(72) Inventors: Emanuele Confalonieri, Segrate (IT); Antonino Caprí, Bergamo (IT); Nicola Del Gatto, Cassina de' Pecchi (IT); Federica Cresci, Milan (IT); Massimiliano Turconi, Gorgonzola (IT)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 18/955,554

(22) Filed: Nov. 21, 2024

(65) Prior Publication Data

US 2025/0085859 A1 Mar. 13, 2025

Related U.S. Application Data

(63) Continuation of application No. 17/968,049, filed on Oct. 18, 2022, now Pat. No. 12,164,773.

(51) Int. Cl.
*G06F 3/06* (2006.01)

(52) U.S. Cl.
CPC .......... *G06F 3/0611* (2013.01); *G06F 3/0629* (2013.01); *G06F 3/0673* (2013.01)

(58) Field of Classification Search
CPC .... G06F 3/0611; G06F 3/0629; G06F 3/0673; G06F 3/0635; G06F 3/0659; G06F 11/1048; G06F 12/08; G06F 3/0683
See application file for complete search history.

(56) References Cited

U.S. PATENT DOCUMENTS 11,409,601 B1 8/2022 Brewer et al.
2007/0286078 A1* 12/2007 Coteus ................ G06F 13/1657 370/235
2008/0320214 A1* 12/2008 Ma .......................... G06F 3/064 711/E12.008
2009/0207663 A1* 8/2009 Kang ..................... G11C 29/44 365/201
2019/0042500 A1* 2/2019 Agarwal ................. G06F 13/28
2022/0050610 A1* 2/2022 Brandt .................. G06F 3/0616

* cited by examiner

*Primary Examiner* — Sean D Rossiter
(74) *Attorney, Agent, or Firm* — Brooks, Cameron & Huebsch, PLLC

(57) ABSTRACT

An apparatus can include a plurality of memory devices and a memory controller coupled to the plurality of memory devices via a plurality of memory channels. The plurality of memory channels can be each organized as a plurality of channel groups that can be operated as independent RAS channels (e.g., channels for independent RAS accesses). Data received at the memory controller via different memory channels of one RAS channel can be aligned at various circuits and/or components of the memory controller.

20 Claims, 5 Drawing Sheets

570

RECEIVING A PLURALITY OF READ COMMANDS RESPECTIVELY AT A SET OF MEDIA CONTROLLERS COUPLED TO A SET OF PHY MEMORY INTERFACES CORRESPONDING TO A RELIABILITY, AVAILABILITY, AND SERVICEABILITY (RAS) CHANNEL — 572

PREVENTING THE SET OF MEDIA CONTROLLERS FROM EXECUTING THE PLURALITY OF READ COMMANDS RESPONSIVE TO RECEIVING, FROM AT LEAST ONE OF THE SET OF PHY MEMORY INTERFACES, A FIRST SIGNAL INDICATIVE OF THE AT LEAST ONE OF THE SET OF PHY MEMORY INTERFACES BEING BUSY UNTIL A SECOND SIGNAL INDICATIVE OF THE AT LEAST ONE OF THE SET OF PHY MEMORY INTERFACES BEING NO LONGER BUSY IS RECEIVED FROM THE AT LEAST ONE OF THE SET OF PHY MEMORY INTERFACES — 574

Figure 5:
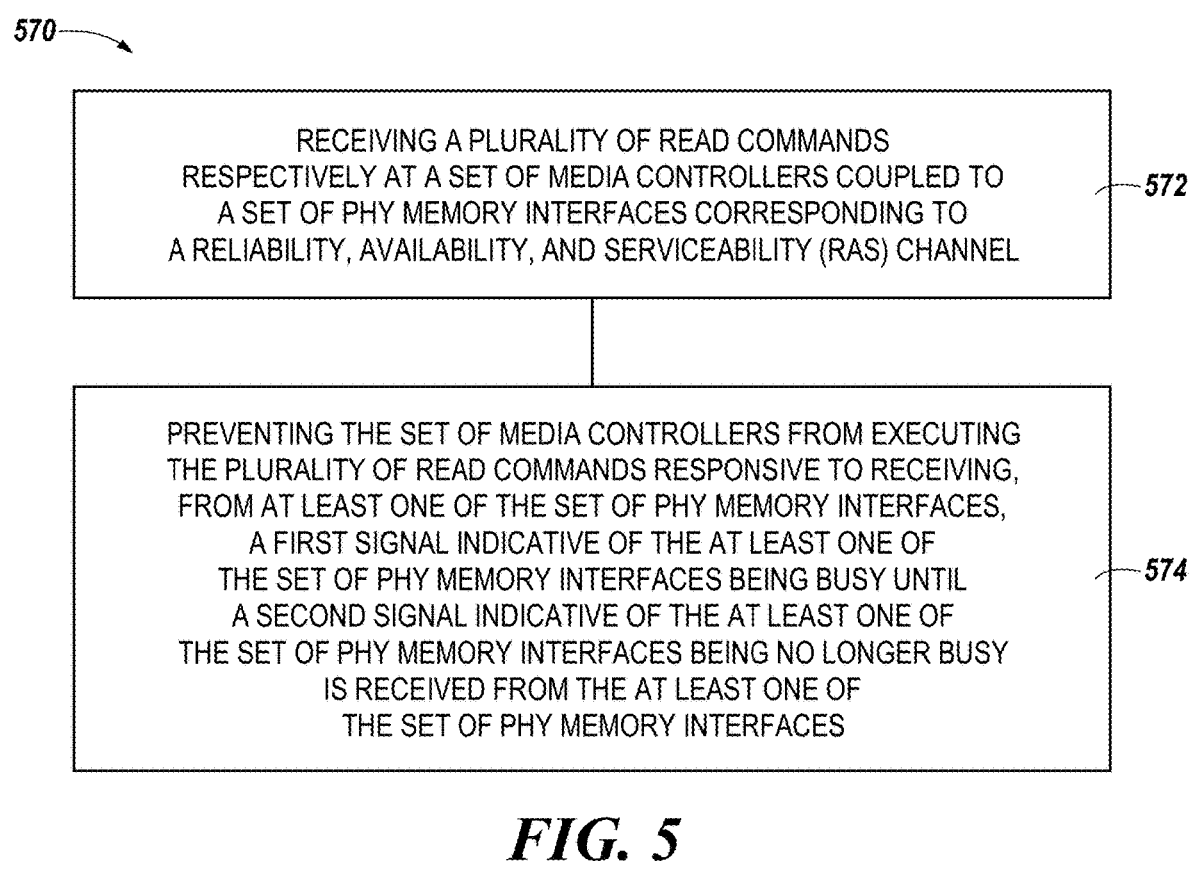

570

RECEIVING A PLURALITY OF READ COMMANDS RESPECTIVELY AT A SET OF MEDIA CONTROLLERS COUPLED TO A SET OF PHY MEMORY INTERFACES CORRESPONDING TO A RELIABILITY, AVAILABILITY, AND SERVICEABILITY (RAS) CHANNEL

572

PREVENTING THE SET OF MEDIA CONTROLLERS FROM EXECUTING THE PLURALITY OF READ COMMANDS RESPONSIVE TO RECEIVING, FROM AT LEAST ONE OF THE SET OF PHY MEMORY INTERFACES, A FIRST SIGNAL INDICATIVE OF THE AT LEAST ONE OF THE SET OF PHY MEMORY INTERFACES BEING BUSY UNTIL A SECOND SIGNAL INDICATIVE OF THE AT LEAST ONE OF THE SET OF PHY MEMORY INTERFACES BEING NO LONGER BUSY IS RECEIVED FROM THE AT LEAST ONE OF THE SET OF PHY MEMORY INTERFACES

CONTROLLER ARCHITECTURE FOR RELIABILITY, AVAILABILITY, SERVICEABILITY ACCESS

PRIORITY INFORMATION

This application is a Continuation of U.S. application Ser. No. 17/968,049, filed on Oct. 18, 2022, the contents of which are incorporated herein by reference.

TECHNICAL FIELD

The present disclosure relates generally to semiconductor memory and methods, and more particularly, to apparatuses, systems, and methods for a controller architecture for reliability, availability, serviceability (RAS) access.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 5 is a flow diagram of a method for operating a memory controller having an architecture for RAS access in accordance with a number of embodiments of the present disclosure.

DETAILED DESCRIPTION

Figure 1:
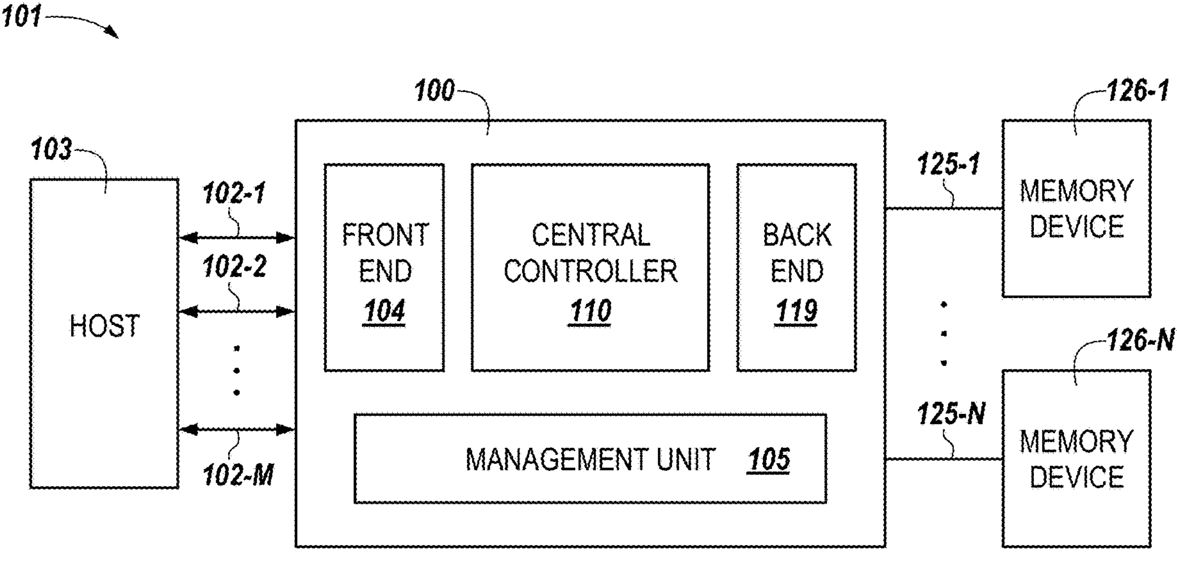
FIG. 1 is a block diagram of a computing system including a memory controller in accordance with a number of embodiments of the present disclosure.

Systems, apparatuses, and methods related to a controller architecture for reliability, availability, serviceability (RAS) access are described. The memory controller can be within a memory system, which can be a memory module, a storage device, or a hybrid of a memory module and a storage device. The memory controller can be coupled to the plurality of memory devices via a plurality of memory channels which can be organized as a plurality of channel groups. Each channel group can be operated as independent RAS channels (e.g., channels for independent RAS accesses).

In various embodiments, therefore, each RAS access can involve accessing data via different channels, which can reduce access latency associated with accessing the memory devices to which the memory controller is coupled (as compared to those RAS accesses not involving data via different channels). Further, the RAS access architecture described herein in association with the present disclosure can be operated to align data received via different memory channels of the same channel group.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 310 in FIG. 3. Analogous elements within a Figure may be referenced with a hyphen and extra numeral or letter. See, for example, elements 126-1, 126-2, 126-N in FIG. 1. Such analogous elements may be generally referenced without the hyphen and extra numeral or letter. For example, elements 126-1, 126-2, 126-N may be collectively referenced as 126. As used herein, the designators "M" and "N" and "X", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of a computing system 101 including a memory controller 100 in accordance with a number of embodiments of the present disclosure. The memory controller 100 includes a front end portion 104, a central controller portion 110, and a back end portion 119. The computing system 101 includes a host 103 and memory devices 126-1, . . . , 126-N coupled to the memory controller 100. The computing system 101 can be, for example, a high performance computing (HPC) data center among various other types of computing systems (e.g., servers, desktop computers, laptop computers, mobile devices, etc.).

Although not shown in FIG. 1, the front end portion 104 can include a physical (PHY) layer and a front end controller for interfacing with the host 103 over a bus 102, which can include a number of input/output (I/O) lanes. The bus 102 can include various combinations of data, address, and control busses, which can be separate busses or one or more combined busses. In at least one embodiment, the interface between the memory controller 100 and the host 103 can be a peripheral component interconnect express (PCIe) physical and electrical interface operated according to a compute express link (CXL) protocol. As non-limiting examples, the bus 102 can be a PCIe 5.0 interface operated in accordance with a CXL 2.0 specification or a PCIe 6.0 interface operated in accordance with a CXL 3.0 specification.

CXL is a high-speed central processing unit (CPU)-to-device and CPU-to-memory interconnect designed to accelerate next-generation data center performance. CXL technology maintains memory coherency between the CPU memory space and memory on attached devices such as accelerators, memory buffers, and smart I/O devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. CXL provides protocols with I/O semantics similar to PCIe (e.g., CXL.io), caching protocol semantics (e.g., CXL-.cache), and memory access semantics (CXL.mem).

The central controller 110 can be responsible for controlling various operations associated with executing memory access requests (e.g., read commands and write commands) from the host 103. For example, as described further below, the central controller 110 can include various error circuitry (e.g., error detection and/or error correction circuitry) capable of generating error detection and/or error correction information for providing data reliability among other RAS functionality in association with writing data to and/or reading data from the memory devices 126. As described further herein, such error detection and/or correction circuitry can include error correcting code (ECC) circuitry, low-power chip kill (LPCK) circuitry, and/or "chip kill" circuitry, for example.

The back end portion 119 can include a number of memory channel controllers (e.g., media controllers) and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, a PHY layer can be included in a respective PHY memory interface (e.g., PHY memory interface 224, 324, and/or 424 illustrated in FIGS. 2-4, respectively). In various embodiments, the physical data transmission medium includes memory channels 125-1, . . . , 125-N. The memory channels 125 can be, for example, 16-bit channels to two 8-bit (×8) devices, although embodiments are not limited to a particular back end interface. As another example, the channels 125 can each also include a two pin data mask inversion (DMI) bus, among other possible bus configurations. The back end portion 119 can exchange data (e.g., user data and error detection and/or correction data) with the memory devices 126 via the physical pins corresponding to the respective memory channels 125. As described further herein, in a number of embodiments, the memory channels 125 can be organized as a number of channel groups, with the memory channels of each group being accessed together in association with executing various memory access operations and/or error detection and/or correction operations.

The memory devices 126 can be, for example, dynamic random access memory (DRAM) devices operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). However, embodiments are not limited to a particular type of memory device 126. For example, the memory devices 126 can be FeRAM devices.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
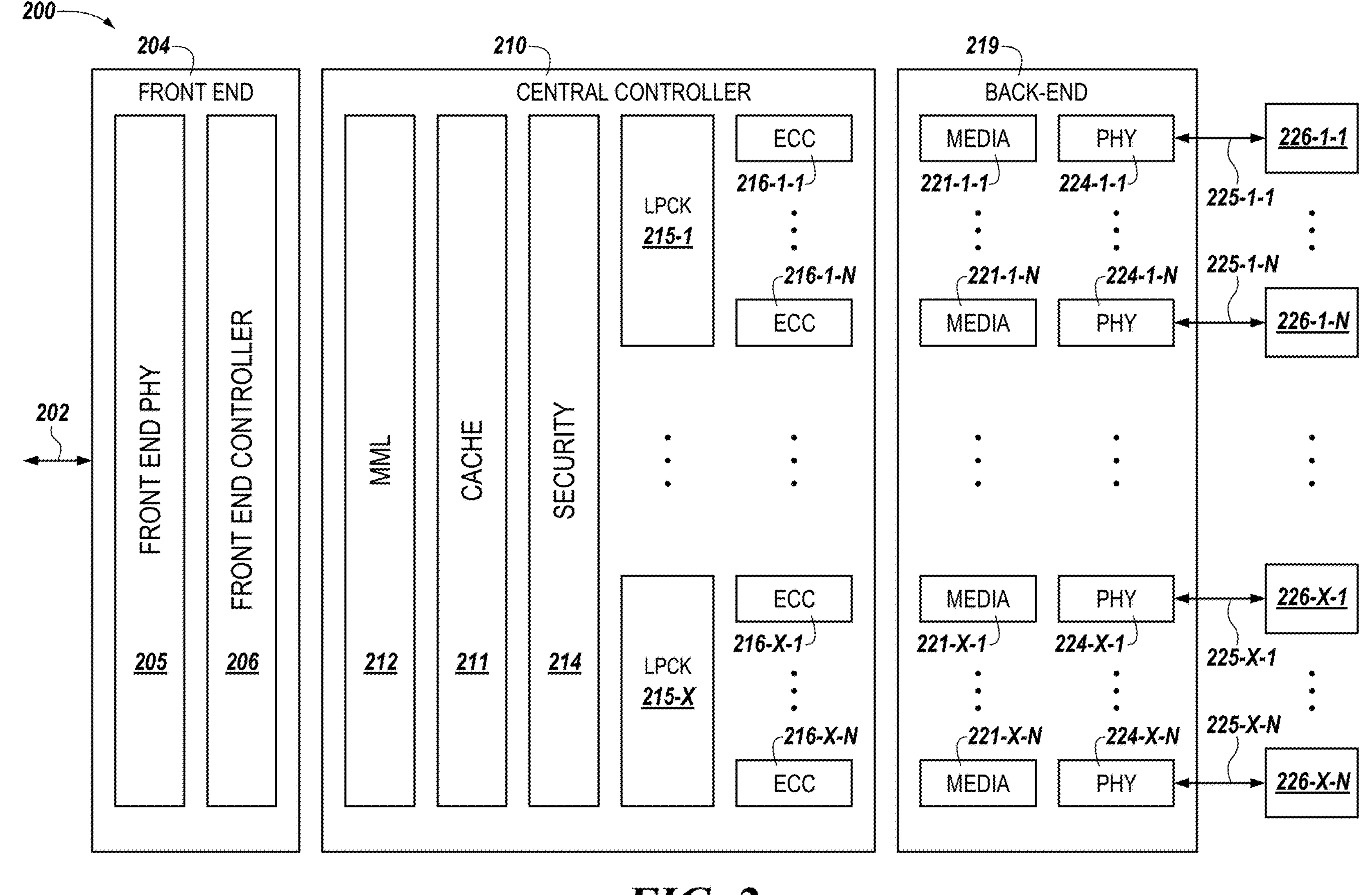
FIG. 2 is a block diagram of a memory controller having data protection channels in accordance with a number of embodiments of the present disclosure.

FIG. 2 is a block diagram of a memory controller 200 having data protection channels in accordance with a number of embodiments of the present disclosure. As shown in FIG. 2, the controller 200 includes a front end portion 204, a central portion 210, and a back end portion 219. The controller 200 can be a controller such as controller 100 described in FIG. 1.

The front end portion 204 includes a front end PHY 205 for interfacing with a host via communication link 202, which can be a CXL link, for example. The front end 204 includes a front end controller 206 to manage the interface and communicate with the central controller 210. In embodiments in which the link 202 is a CXL link, the front end controller 206 is configured to receive (e.g., from a host) memory access requests, according to a CXL protocol, directed at the memory devices 226.

As shown in FIG. 2, the central controller 210 can include a media management layer (MML) 212 that can be used to translate memory access requests in accordance with a particular protocol (e.g., CXL compliant requests) into a protocol compliant with the particular memory controller 200 and/or particular type of memory media (e.g., memory devices 226). The central controller 210 can also include a cache 211, which can include an associated cache controller. The cache 211 can be used, for example, to temporarily store data frequently accessed (e.g., by a host).

The central controller portion 210 further includes a security component 214 to encrypt/decrypt data (e.g., an UDB corresponding to a write command). Data received from the cache 211 (e.g., data corresponding to a cache line)

and in plain text form can be input (e.g., transferred) to the security component 214 and can be converted to cypher text as a result of being encrypted at the security component 214. As used herein, the UDB in cypher text form can be alternatively referred to as an "encrypted UDB", which can be alternatively referred to as an "encrypted version of an UDB". Although embodiments are not so limited, the security component 214 can operate using an AES encryption/decryption (e.g., algorithm).

The central controller portion 210 includes low-power chip kill (LPCK) component 215 to generate and/or update LPCK parity data (e.g., a PDB) based on data (e.g., data corresponding to a cache line) input to the LPCK component 215, and/or perform chip kill operations on data received from memory devices 226. The data input to the LPCK component can be in cypher text form as the data were encrypted at the security encoder 217.

The term "chip kill" generally refers to a form of error correction that protects memory systems (e.g., the memory system 101 shown in FIG. 1) from any single memory die (e.g., memory die 327 illustrated in FIG. 3) and/or memory device 226 (chip) failure as well as multi-bit error from any portion of a single memory chip. Chip kill circuitry can increase the stability of the data and correct errors in the data with a desired chip kill protection collectively across subsets (e.g., access groups as described herein) of the memory devices 226.

An example chip kill implementation that can be provided by each LPCK component 215 and comprising five memory channels 225 corresponding to a bus width of 80 bits (16 bits/channel×5 channels) can include writing data to memory devices 226 of four memory channels 225 and parity data to memory devices 226 of one memory channel 225. Four codewords can be written, each composed of eleven four-bit symbols, with each symbol belonging to a different channel/device. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory device 226. A multibit symbol can be a non-binary symbol. For example, non-binary symbol(s) having N bits can be one of $2^N$ elements of a finite Galois field. As used herein, a multibit symbol and a non-binary symbol are used interchangeably here and can have the same meaning, as appropriate to the context.

The N parity symbols can allow the LPCK component 215 to correct up to one symbol error in each codeword and to detect up to two symbol errors. In various embodiments, the data symbols and the parity symbols can be written or read concurrently (e.g., substantially simultaneously) from memory devices of N memory channels. If every bit symbol in a die fails, only the bit symbols from that memory device 226 in the codeword will fail. This allows memory contents to be reconstructed despite the complete failure of one memory device 2226. The aforementioned chip kill operation is considered to be "on-the-fly correction" because the data is corrected without impacting performance by performing a recovery operation. Embodiments are not limited to the particular example chip kill operation described above. In contrast to chip kill operations that may not involve a recovery operation, various RAID approaches are considered to be "check-and-recover correction" because a recovery process is initiated to recover data subject to an error. For example, if an error in a symbol of a RAID stripe is determined to be uncorrectable, then the corresponding data can be recovered/reconstructed by reading the remaining user data of the stripe and XORing with the stripe's corresponding parity data.

As shown in FIG. 2, the central controller portion 210 can include ECC components 216-1-1, . . . , 216-1-N and 216-X-1, . . . , 216-X-N (alternatively referred to as "error correction circuits"). The data transferred to each ECC component 216 can be in cypher text form as the data were previously encrypted at the security component 214. Each ECC component 216 can be configured to generate ECC data (alternatively referred to as "error correction information") based on data (e.g., a portion of data corresponding to a cache line) transferred from the respective LPCK component 215. The ECC data can include parity data. Each ECC component 216 can be responsible for respective memory devices 226, although embodiments are not so limited. For example, each ECC component 216 can operate based on input data to be transferred and written to each memory device 226.

As shown in FIG. 2, the memory controller 200 can include a back end portion 219 coupled to the central controller portion 210. The back end portion 219 can include media controllers 221-1-1, . . . , 221-1-N and 221-X-1, . . . , 221-X-N that are respectively coupled to physical (PHY) memory interfaces 224-1-1, . . . , 224-1-N and 224-X-1, . . . , 224-X-N. The PHY memory interfaces 224-1-1, . . . , 224-1-N and 224-X-1, . . . , 224-X-N are respectively coupled to memory devices 226-1-1, . . . , 226-1-N and 226-X-1, . . . , 226-X-N via memory channels 225-1-1, . . . , 225-1-N and 225-X-1, . . . , 225-X-N.

The media controllers 221-1, . . . , 221-N can be used substantially simultaneously to drive the channels 225-1-1, . . . , 225-1-X and 225-N-1, . . . , 225-N-X simultaneously. In at least one embodiment, each of the media controllers 221 can receive a same command and address and drive the channels 225 substantially simultaneously. By using the same command and address, each of the media controllers 221 (belonging to the same channel group) can utilize the channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

Figure 3:
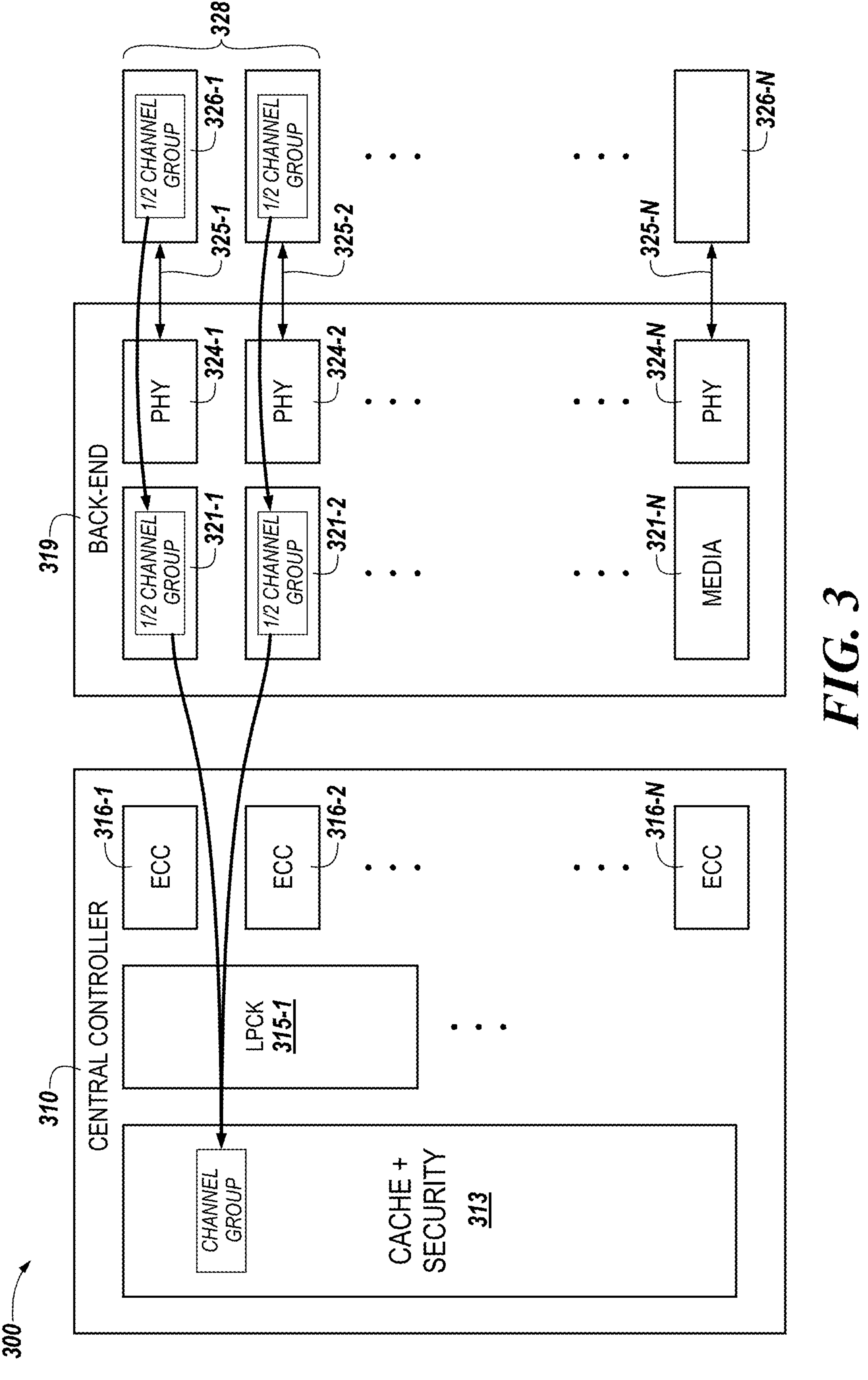
FIG. 3 is a block diagram of a memory controller having reliability, availability, and serviceability (RAS) channels in accordance with a number of embodiments of the present disclosure.
Figure 4:
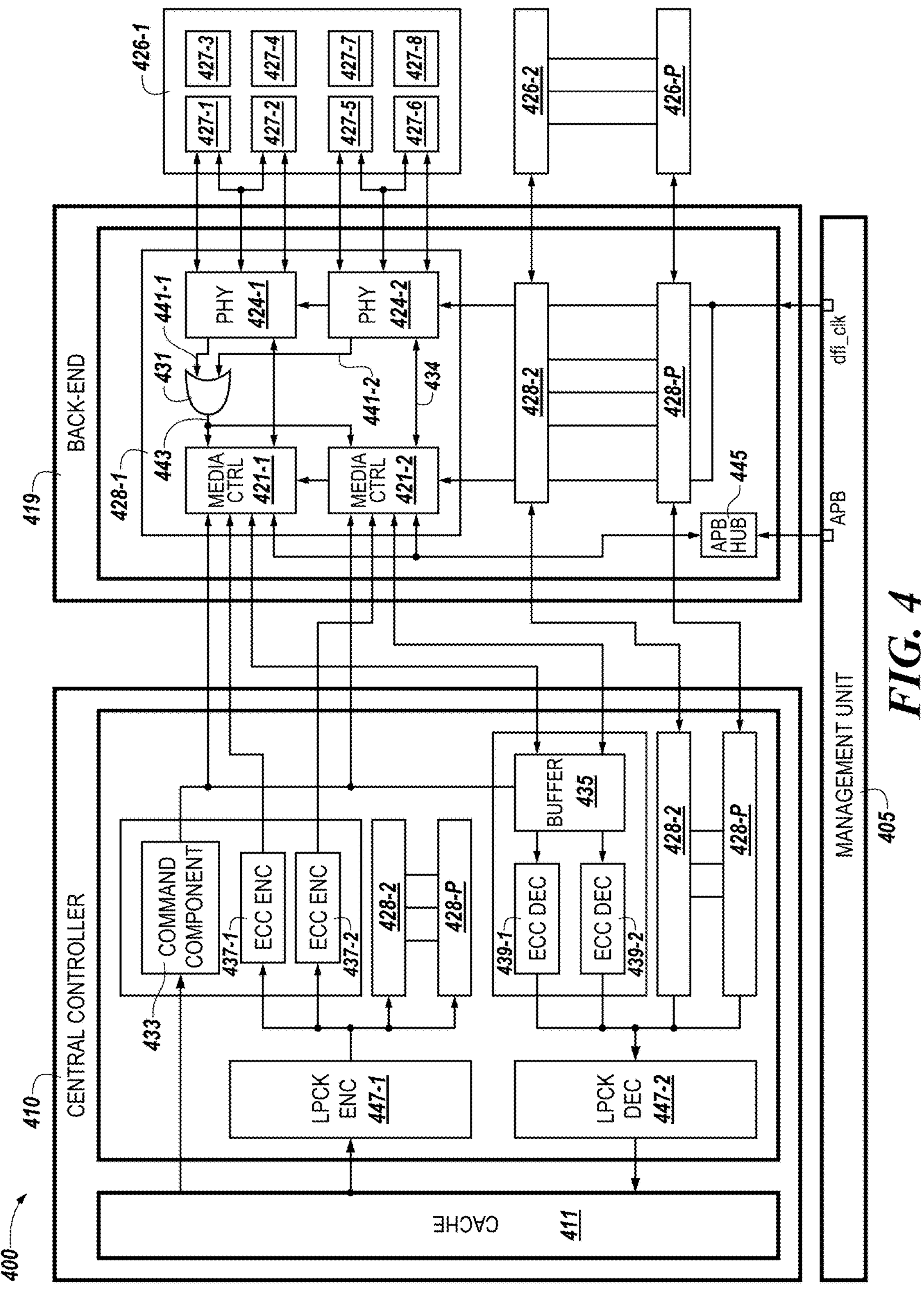
FIG. 4 is a block diagram of a memory controller having RAS channels in accordance with a number of embodiments of the present disclosure.

Media controllers 221 can drive memory channels 225 substantially simultaneously to read data corresponding to a cache line from memory devices 226. For example, data corresponding to a cache line and read (e.g., accessed) from memory devices 225 must arrive at central controller 210 before any further processing of the data. Therefore, if the data is not returned by the media controllers 221 at the same time or is returned in an undesirably different order (e.g., read commands are performed on memory devices in an order that is different than which the commands were received), the central controller 210 will not be able to further processes the data which can add latency to the memory system. This latency can be introduced by (e.g., a physical layer on) a PHY memory interface 224 triggering training, the central controller 210 issuing different commands to memory controllers 221 on the number of memory channels 225, memory controller registers being programmed at different times, and/or media controllers 221 running at different clock times, among other causes for latency. Therefore, upon receiving a read command from the central controller 210, (e.g., a physical layer of) each PHY memory interface 224 can determine whether it can promptly execute the read command. If the PHY memory interface 224 determines that it is unable to promptly execute the read command (e.g., busy), the PHY memory interface 224 can send (e.g., provide) a signal, which can be further propagated to those media controllers 221 of a same channel group as the PHY memory interface 224. When received by the media controllers 221, the signal can cause the media controllers 221 can halt executing the read commands until indicated otherwise by the PHY memory interface 224. Further details of the communication between PHY memory interfaces 224 and media controllers 221 are illustrated in FIGS. 3-5.

The PHY memory interfaces 224 can be an LPDDRx memory interface. In some embodiments, each of the PHY memory interfaces 224 can include data and DMI pins. For example, each PHY memory interface 224 can include four data pins (DQ pins) and one DMI pins. The media controllers 221 can be configured to exchange data (e.g., UDB and/or auxiliary data) with a respective number of memory devices 226 via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In some embodiments, DMI and DQ pins of a same memory die can be simultaneously utilized such that data can be transferred and/or exchanged from the memory die simultaneously via the DMI and DQ pins.

The channels 225 can include a number of separate data protection channels (alternatively referred to as RAS (Reliability, Availability, and Serviceability) channel), which can each comprise a number of memory devices (e.g., dice) 226 accessed together in association with a particular data protection scheme (e.g., ECC, RAID, LPCK, etc.). The data protection channels can be standard RAS channels or LPCK channels depending on whether the LPCK components 215 are enabled or disabled.

As used herein, the term "LPCK channel" refers to one or more memory channels (e.g., memory channels 125 and/or illustrated in FIGS. 1 and 2, respectively) that are accessed together for LPCK access. Alternatively speaking, a LPCK channel can be an access unit for transfer of a single LPCK stripe. As used herein, the term "standard RAS channel" refers to one or more memory channels (e.g., memory channels 125 and/or illustrated in FIGS. 1 and 2, respectively) that are accessed together when LPCK components 215 are disabled. The term "standard RAS channel" can be alternatively referred to as "non-LPCK channel". When the LPCK components 215 are disabled, memory channels 225 can be accessed together (or independently) to access data corresponding to a cache line depending on a cache line mapping over the channels 225.

In one example, in which the LPCK components 215 are enabled, one access group can include the LPCK component 215-1, ECC components 216-1-1, . . . , 216-1-N, media controllers 221-1-1, . . . , 221-1-N, PHY memory interfaces 224-1-1, . . . , 224-1-N, and memory channels 225-1-1, . . . , 225-1-N; and another access group can include the LPCK component 215-X, ECC components 216-X-1, . . . 216-X-N, media controllers 221-X-1, . . . , 221-X-N, PHY memory interfaces 224-X-1, . . . , 224-X-N, and memory channels 225-X-1, . . . , 225-X-N. In another example, in which the LPCK components 215 are disabled, each cache line of the cache 211 can be mapped to locations of the memory devices 226 differently than when enabled such that ECC components 216, media controllers 221, PHY memory interfaces 224, and/or memory channels 225 can be organized in a different manner. For example, each access group can include a quantity of (e.g., two) ECC components 216, media controllers 221, PHY memory interfaces 224, and memory channels 225 regardless of whether they are coupled to the same or different LPCK components 215. Further details of how a cache line is mapped to the memory devices 226 when the LPCK components 215 are disabled are described in connection with FIG. 3.

Although not illustrated in FIG. 2, the memory controller 200 can further include other error detection circuitry that can perform a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

FIG. 3 is a block diagram of a memory controller 300 having reliability, availability, and serviceability (RAS) channels (e.g., RAS channel 328) in accordance with a number of embodiments of the present disclosure. The cache 311, security component 314, LPCK component 315, ECC components 316, media controller 321, PHY memory interfaces 324, memory channels 325, and memory devices 326 illustrated in FIG. 3 can be analogous to the cache 211, security component 214, LPCK component 215, ECC components 216, media controller 221, PHY memory interfaces 224, memory channels 225, and memory devices 226 illustrated in FIG. 2.

The memory controller 300 is analogous to the memory controller 200, the memory controller 300 is not illustrated in its entirety in FIG. 3. For example, the memory controller 300 can include those circuitry/components not illustrated in FIG. 3 but illustrated as being part of the memory controller 200 in FIG. 2.

FIG. 3 illustrates an example scenario, in which the LCPK component 315 is disabled such that the memory controller 200 is configured to operate with standard RAS channels. For example, two ECC components 316-1, 316-2, two media controllers 321-1, 321-2, two PHY memory interfaces 324-1, 324-2, two memory channels 325-1, 325-2, and two memory devices 326-1, 326-2 can be organized as part of a same (standard) channel group, such as an example RAS channel 328 illustrated in FIG. 3.

In a further particular example, the example standard RAS channel 328 can be accessed by transferring a chunk of 128 bytes ("½ CHANNEL GROUP" shown in FIG. 3) of user data from each memory device 326-1 and 326-2 (via memory channels 325-1 and 325-2) respectively to the back end 319 (to the PHY memory interfaces 324-1 and 324-2 and media controller 321-1 and 321-2) at which the chunks of 256 bytes (128 bytes/memory channel * two memory channels 325) are aligned. When aligned, each chunk of 128 bytes is then further transferred to the respective ECC component 316 (e.g., 128 bytes transferred from the memory devices 326-1 to the ECC component 316-1 and 128 bytes transferred from the memory devices 326-2 to the ECC component 316-2). Each chunk of 128 bytes can be error-corrected at the respective ECC component 316 can be further to circuitry/component 313 ("CACHE+SECURITY" shown in FIG. 3), which can include a cache (e.g., the cache 211 illustrated in FIG. 2) and a security component (e.g., the security component 214 illustrated in FIG. 2) as a chunk of 256 bytes ("CHANNEL GROUP" shown in FIG. 3). As 128 bytes of data that are desired to be substantially simultaneously accessed and aligned further corresponds to a cache line, data corresponding to a standard RAS channel can alternatively referred to as "data corresponding to a cache line", as well. Further details of how chunks of data received from the respective memory device 326 are aligned are further described in connection with FIG. 4.

FIG. 4 is a block diagram of a memory controller 400 having RAS channels 428 in accordance with a number of embodiments of the present disclosure. The cache 411, media controllers 421, PHY memory interfaces 424, memory channels 425, and memory devices 426 illustrated in FIG. 4 can be analogous to the cache 211, media controllers 221, PHY memory interfaces 224, memory channels 225, and memory devices 226 illustrated in FIG. 2. Further, a (standard) RAS channel 428 can be analogous to the RAS channel 328.

The LPCK encoder 447-1 and decoder 447-2 can be part of the LPCK component 215 and/or 315 illustrated in FIGS. 2 and 3. The LPCK encoder 447-1 can generate (e.g., or update) LPCK parity data based on user data (alternatively referred to as host data) received from the host (e.g., the host 103 illustrated in FIG. 1), while the LPCK decoder 447-2 can perform a chip kill (e.g., LPCK) operation based on the LPCK parity data previously generated at the LPCK encoder 447-1 as well as data received from the memory devices 426.

The memory controller 400 can be analogous to the memory controllers 100, 200, and/or 300 illustrated in FIGS. 1-3. While the memory controller 400 is not illustrated in its entirety in FIG. 4, the memory controller 400 is analogous to the memory controller 100, 200, and/or 300 illustrated in FIGS. 1-3. For example, the memory controller 400 can include those circuitry/components not illustrated in FIG. 4 but illustrated as being part of the memory controller 200 in FIG. 2.

As illustrated in FIG. 4, a number of circuitries and components of the memory controller 200 can be each organized in different (standard) RAS channels 428-1, . . . , 428-P. For example, an example RAS channel 428-1 can include a command component 433, ECC encoders 437-1, 437-2, media controllers 421-1, 421-2, a logic (e.g., OR) gate 431, PHY memory interfaces 424-1, 424-2, memory devices 426-1, 426-2, a buffer 435, and ECC decoders 439-1, 439-2. Although embodiments are not so limited, the other RAS channels 428-2, . . . , 428-P can also include a same quantity/types of circuitries and/or components illustrated as being part of the example RAS channel 428-1. The RAS channels 428 can correspond to a standard RAS channel, which is operated by the memory controller 400 that operates with the LPCK component 215 (e.g., including the LPCK encoder 447-1 and decoder 447-2) disabled.

The RAS channels 428 can operate based on a clock signal (provided via a "dfi_clk" pin as shown in FIG. 4) provided from the management unit 405 to each media controller 421 and PHY memory interface 424 of the RAS channels 428. In some embodiments, a clock signal can be a DDR physical interface (DFI) clock signal. Further, each media controller 421 of RAS channels 428 can be coupled to an Advanced Microcontroller Bus Architecture (AMBA) Peripheral Bus (APB) hub 445 (e.g., via a "APB" pin shown in FIG. 4).

The ECC encoders 437-1 and 437-2 can be paired respectively with the ECC decoders 439-1 and 439-2 and each pair can be part of a respective ECC component 216 and/or 316 illustrated in FIGS. 2 and 3, respectively. For example, a pair of ECC encoder 437-1 and decoder 439-1 can be part of the ECC component 216-1 and/or 316-1, while a pair of ECC encoder 437-2 and decoder 439-2 can be part of the ECC component 216-2 and/or 316-2 illustrated in FIGS. 2 and 3, respectively. The ECC encoder 437 can generate error correction information (e.g., parity data) based on a respective chunk of data (e.g., 128 bytes) received from the cache 411, while the ECC decoder 439 can perform an error correction operation using the error correction information generated at the ECC encoder 437 of the pair.

When writing data corresponding to a cache line (e.g., 256 bytes) from the cache 411 to the memory devices 426, the cache 411 can cause the command component 433 to further cause the respective media controllers 421-1 and 421-2 respectively via control busses (that are respectively coupled to "L_BUS_ctrl" pins of the media controllers 421-1 and 42-2 as shown in FIG. 4) to read data respectively from the ECC encoders 437-1 and 437-2. As used herein, the term "control bus" refers to a bus used to transfer commands to cause performance of various memory and/or logical operations. Upon receiving the data from the ECC encoders 437-1 and 437-2, the media controllers 421-1 and 421-2 can further write the data to the respective memory device 426-1 or 426-2.

As illustrated in FIG. 4, each memory device 426 (e.g., memory device 426-1 or 426-2) can include a respective set of memory dice 427 to which a chunk of data (e.g., 128 bytes) can be written over. In one embodiment, the chunk of data that corresponds to a same cache line can be written over two memory dice 427 that are respectively coupled to the PHY memory interface 424 via DMI pins (e.g., 8 DMI pins) and one or more DQ pins (e.g., 1 DQ pin). In another embodiment, the chunk of data that corresponds to a same cache line can be written over four memory dice 427 among which only two memory dice 427 are respectively coupled to the PHY memory interface 424 via DMI pins (e.g., 8 DMI pins) and one or more DQ pins (e.g., 1 DQ pin). For example, the memory dice 427-3 and 427-4 (alternatively referred to as "secondary memory dice") can be internally coupled to the memory dice 427-1 and 427-2 (alternatively referred to as "primary memory dice"), respectively, via a respective internal data link. Further, the memory dice 427-1 and 427-2 can be coupled to the memory controller via a respective external link (e.g., memory channels 425). As used herein, the term "primary memory die" refers to a memory die including an external data link. Further, as used herein, the term "secondary memory die" refers to a memory die including an internal data link. In this example, the secondary memory dice 427-3 and 427-4 can be configured to transfer data respectively to the primary memory dice 427-1 and 427-2 via the internal data link to cause the primary memory dice 427-1 and 427-to further transfer the data via the external data link or, alternatively, work as two independent pair (427-1/427-2 and 427-3/427-4).

The back-end portion 419 can include a logic gate 431 (e.g., OR gate) coupled between the PHY memory interfaces 424-1 and 424-2 and media controllers 421-1 and 421-2. When reading data corresponding to a cache line (e.g., 256 bytes) from the memory devices 426 to the cache 411, the cache 411 can cause the command component 433 to issue read commands to the respective media controllers 421 (e.g., media controllers 421-1 and 421-2), which then execute the read commands to read data from the respective memory devices 426. The received read commands can be executed by the media controllers 421 (e.g., media controllers 421-1 and 421-2) in a manner, in which data corresponding to the read commands and a cache line are aligned prior to being further transferred to the buffer 435 and/or ECC decoders 439 (e.g., ECC decoders 439-1 and 439-2).

The logic gate 431 can operate to strengthen the data alignment. When one of PHY memory interfaces 424 (e.g., PHY memory interfaces 424-1 and 424-2) is busy (e.g., busy requesting and/or performing training), a notification (e.g., a first signal) that the PHY memory interface 424 is busy can be sent to logic gate 431 via a respective input signal bus 441 (e.g., an input signal bus 441-1 or 441-2). The notification can be received by the logic gate 431 and transmitted from the logic gate 431 to each memory controller 421 (e.g., media controller 421-1 and 421-2) via output signal buses 443. When each of the media controller 421 receives the notification, the media controllers 421 can block (alternatively referred to as "prevent") commands (e.g., read commands) from being executed, which can reduce and/or eliminate any latency in the memory system caused by one of the memory channels being unable to execute commands. Alternatively stated, when each of the media controller 421 receives the notification, the media controllers 421 can prevent PHY memory interfaces of a channel group from accessing respective memory devices 426.

Upon receiving the notification, the memory controller 421 that is on the same memory channel 425 as the "busy" PHY memory interface 424 can send an acknowledgement (e.g., a signal) of receipt of the notification to the "busy" PHY memory interface 424. For example, when PHY memory interfaces 424-1 sends a notification that the PHY memory interface 424-1 is busy to the memory controller 421-1, the memory controller 421-1 can send an acknowledgement of receiving the notification to the PHY memory interface 424-1 via a data bus 434.

When the PHY memory interface 424 (e.g., PHY memory interfaces 424-1 and/or 424-2) that has been busy is no longer busy (e.g., a training operation is complete), another notification (e.g., a second signal) that the physical layer is no longer busy can be sent to the respective media controllers 421 (e.g., memory controllers 421-1 and 421-2) via the logic gate 431. When each of the media controllers 421-1 and 421-2 receives the notification, the media controllers 421-1 and 421-2 can resume executing commands (e.g., read commands) to access data corresponding to a cache line (e.g., alternatively, corresponding to a standard RAS channel) substantially simultaneously, which provide benefits of aligning data despite that one of the media controllers 421 corresponding to a standard RAS channel was unable to execute commands.

The memory controller 421 that is on the same channel as the PHY memory interface 424 (that has sent the notification that the PHY memory interface is no longer busy) can send an acknowledgement (e.g., a signal) of receipt of the notification. For example, when physical layer on PHY memory interfaces 424-1 sends a notification that the physical layer is no longer busy to each of the memory controllers 421-1, . . . , 421-X via the first portions 344-1, . . . , 344-X, logic gate 431, and second portion 338 of the side-band, memory controller 421-1 (which is on the same channel as physical layer on PHY memory interfaces 424-1) can send an acknowledgement of receiving the notification that the physical layer is no longer busy on bus 340-1.

Once data are received at the media controllers 421-1 and 421-2 as part of executing read commands (e.g., read commands corresponding to a standard RAS channel), the media controllers 421-1 and 421-2 can further transfer the respective chunk (e.g., 128 bytes) of data to the buffer 435, at which the chunks (e.g., 256 bytes) from both media controllers 421 can be aligned prior to being further transferred to the ECC decoders 439. For example, at the buffer 435, it is checked whether data alignment has achieved (e.g., whether data have been received from each one of memory devices 426 corresponding to the cache line and a same channel group). If it is not confirmed (e.g., by a particular period of time, such as two clock cycles (tclk)) that the data alignment is achieved at the buffer 435 (e.g., one or more chunks of data from the memory devices 426 are missing), the buffer 435 can cause the media controllers 421 (e.g., media controllers 421-1 and 421-2) to block (alternatively referred to as "prevent") subsequent read commands (e.g., "new" read commands that are not related to the data misalignment, but are awaiting to be executed at the media controllers 421) from being executed to start a re-alignment procedure. Alternatively speaking, the buffer 435 can wait for two clock cycles and cause the media controllers 421 to block subsequent read commands if there still exists the data misalignment even subsequent to two clock cycles. In the realignment procedure, the buffer 435 can cause the media controllers 421 to align the chunks of data and can allow the media controllers 421 to resume executing commands (e.g., the subsequent commands) when it is confirmed that the data alignment is achieved. The buffer 435 can include various (e.g., logic) circuitry to facilitate and/or orchestrate the operations described herein.

If it is confirmed that the data alignment is achieved at the buffer 435 (e.g., every chunks of data corresponding to the cache line and the channel group are received at the buffer 435), the aligned chunks can be respectively transferred to the ECC decoders 439-1 and 439-2, at which respective error correction operation are performed on each chunk (e.g., 128 bytes) of data, as described herein.

In a non-limiting example, an apparatus (e.g., the computing system 101 illustrated in FIG. 1) can include a plurality of memory devices (e.g., the memory devices 126, 226, 326, and/or 426 illustrated in FIGS. 1-4, respectively) and a memory controller (e.g., the memory controller 100, 200, 300, and/or 400 illustrated in FIGS. 1-4, respectively) coupled to the plurality of memory devices via a plurality of memory channels (e.g., the memory channels 125, 225, 325, and/or 425 illustrated in FIGS. 1-4, respectively). The plurality of memory channels can be each organized as a plurality of channel groups (e.g., the channel groups 328 and/or 428 illustrated in FIGS. 3 and 4, respectively). Each channel group of the plurality of channel groups can be a unit of write or read access from the memory controller. The memory controller can be configured to align data transferred from different memory channels of the plurality of memory channels and corresponding to a channel group of the plurality of channel groups based on one or more signals (e.g., signals provided to the media controllers 421 via an output signal bus 443 illustrated in FIG. 4) corresponding to at least a portion of the different memory channels and respectively indicating that whether physical (PHY) memory interfaces (e.g., PHY memory interfaces 224, 324, and/or 424 illustrated in FIGS. 2 to 4, respectively) respectively corresponding to the at least the portion of the different memory channels are busy.

In some embodiments, each channel group of the plurality of channel groups comprises error correction code (ECC)

component that is operated, by the memory controller, in association with accessing memory devices of the plurality of memory devices corresponding to the respective channel group. In some embodiments, the memory controller can be configured to operate the plurality of channel groups as independent respective reliability, availability, and serviceability (RAS) channels.

In some embodiments, the memory controller can further include a plurality of media controllers (e.g., the media controllers 221, 321, and/or 421 illustrated in FIGS. 2-4, respectively) that can be respectively coupled to the different memory channels corresponding to one channel group. In this example, the memory controller can be configured to prevent the plurality of media controllers from accessing memory device 126, 226, 326, 426 coupled to the different channels in response to receipt of the one or more signals indicating that the memory interfaces are busy.

Continuing with this example, the memory controller further can include a logic gate (e.g., the logic gate 431 illustrated in FIG. 4) coupled between the PHY memory interfaces and the plurality of media controllers. The logic gate can be configured to provide, to each media controller of the plurality of media controllers, output signals (e.g., a signal provided via a signal bus 443 illustrated in FIG. 4) indicative of the PHY memory interfaces being busy in response to the logic gate receiving first input signals (e.g., signal provided via a respective signal bus 441 illustrated in FIG. 4) indicative of the PHY memory interfaces being busy. Further, each media controller of the plurality of media controllers can be configured to cause PHY memory interface corresponding to the different channels to access the memory devices corresponding to the different channels in response to receipt of one or more signals indicating that the PHY memory interfaces corresponding to the at least the portion of the different memory channels are no longer busy.

In another non-limiting example, a memory controller (e.g., the memory controller 100, 200, 300, and/or 400 illustrated in FIGS. 1-4, respectively) can include a front end portion (e.g., the first end portion 104 and/or 204 illustrated in FIGS. 1-2, respectively) configured to be coupled to a host (e.g., the host 103 illustrated in FIG. 1) via an interface (e.g., the interface 102 and/or 202 illustrated in FIGS. 1-2, respectively). The memory controller can further include a central portion (e.g., the central portion 110, 210, 310, and/or 410 illustrated in FIGS. 1-4, respectively) and a back end portion (e.g., the back end portion 119, 219, 319, and/or 419 illustrated in FIGS. 1-4, respectively) configured to be coupled to a plurality of memory devices (e.g., the memory devices 126, 226, 326, and/or 426 illustrated in FIGS. 1-4, respectively) via a plurality of memory channels (e.g., the memory channels 125, 225, 325, and/or 425 illustrated in FIGS. 1-4, respectively). The plurality of memory channels can be each organized as a plurality of channel groups (e.g., the channel groups 328 and/or 428 illustrated in FIGS. 3 and 4, respectively). Each channel group of the plurality of channel groups can be a unit of write or read access from the memory controller. Each channel group of the plurality of channels groups can include a set of PHY memory interfaces (e.g., the memory interfaces 224, 324, and/or 424 illustrated in FIGS. 2-4, respectively) and a set of media controllers (e.g., the media controllers 221, 321, and/or 421 illustrated in FIGS. 2-4, respectively) respectively coupled to the set of PHY memory interfaces. The memory controller can be configured to prevent each of the set of PHY memory interfaces from accessing memory devices corresponding to a respective channel group of the plurality of channels groups in response to at least one PHY memory interface of the set of PHY memory interfaces indicating that the at least one PHY memory interface is busy.

In some embodiments, the set of PHY memory interfaces can be coupled to a logic gate (e.g., the logic gate 431 illustrated in FIG. 4) and respectively to the set of media controllers via the logic gate (e.g., an OR logic gate). In this example, the at least one PHY memory interface can be configured to provide, to the logic gate, an input signal (e.g., signal provided via a signal bus 441-1 or 441-2 illustrated in FIG. 4) indicative of the at least one PHY memory interface being busy. Further, the logic gate can be configured to provide, to each media controller of the set, an output signal (e.g., signal provided via a signal bus 443 illustrated in FIG. 4) indicative of the at least one PHY memory interface being busy in response to receipt of the input signal from the at least one PHY memory interface. Further, the set of media controller are configured to prevent, in response to receipt of the respective output signals from the logic gate, the set of PHY memory interfaces from accessing the memory devices corresponding to the respective channel group.

Continuing with this example, the at least one PHY memory interface can be configured to provide, to the logic gate, an input signal (e.g., signal provided via a signal bus 441-1 or 441-2 illustrated in FIG. 4) indicating that the at least one PHY memory interface being no long busy. In this example, the logic gate can be configured to provide, to each media controller of the set, an output signal (e.g., signal provided via a signal bus 443 illustrated in FIG. 4) to each media controller indicative of the at least one PHY memory interface being no longer busy in response to receipt of the input signal from the at least one PHY memory interface. Further, in this example, the set of media controller can be configured to allow, in response to receipt of the respective output signals from the logic gate, the set of PHY memory interfaces to access the memory devices corresponding to the respective channel group.

In some embodiments, each channel group of the plurality of channels groups can include error correction code (ECC) component (e.g., ECC component 216 and/or 316 illustrated in FIGS. 2 and 3, respectively) comprising a set of ECC decoders (e.g., ECC decoder 447-2 illustrated in FIG. 4) respectively coupled to the set of media controllers via an intermediate buffer (e.g., the buffer 435 illustrated in FIG. 4). The intermediate buffer can be configured to align data received from the set of media controllers prior to transferring subsets of the data respectively to the set of ECC decoders. The interface can operate in accordance with a compute express link (CXL) protocol.

In another non-limiting example, an apparatus can include a plurality of memory devices (e.g., the memory devices 126, 226, 326, and/or 426 illustrated in FIGS. 1-4, respectively) and a memory controller (e.g., the memory controller 100, 200, 300, and/or 400 illustrated in FIGS. 1-4, respectively) coupled to the plurality of memory devices via a plurality of memory channels (e.g., the memory channels 125, 225, 325, and/or 425 illustrated in FIGS. 1-4, respectively). The plurality of memory channels can be each organized as a plurality of channel groups (e.g., the channel groups 428 illustrated in FIG. 4, respectively). Each channel group of the plurality of channel groups can be a unit of write or read access from the memory controller. The memory controller can further include a plurality of PHY memory interfaces (e.g., the memory interfaces 224, 324, and/or 424 illustrated in FIGS. 2-4, respectively) respectively coupled to the plurality of memory channels and a plurality of media controllers (e.g., the media controllers 221, 321, and/or 421 illustrated in FIGS. 2-4, respectively)

respectively coupled to the plurality of PHY memory interfaces. Each channel group of the plurality of channel groups can further include a set of PHY memory interfaces (e.g., the memory interfaces 224, 324, and/or 424 illustrated in FIGS. 2-4, respectively) of the plurality of PHY memory interfaces and a set of media controllers respectively coupled to the set of media controllers. Each channel group can further include a logic gate (e.g., the logic gate 431 illustrated in FIG. 4) coupled between the set of PHY memory interfaces and the set of media controllers. The logic gate can be configured to provide, to each media controller of the respective set, an output signal (e.g., signal provided via a signal bus 443 illustrated in FIG. 4) indicative of whether a respective PHY memory interface is busy. In some embodiments, the memory controller can be configured to operate the plurality of channel groups as independent respective reliability, availability, and serviceability (RAS) channels.

In some embodiments, the memory controller can be configured to substantially simultaneously access memory devices of the plurality of memory devices corresponding to each channel group of the plurality of channel groups. In some embodiments, each channel group of the plurality of channels groups further comprises a set of error correction circuits (e.g., ECC component 216 and/or 316 illustrated in FIGS. 2 and 3, respectively) respectively coupled to the set of media controllers. Each error correction circuit of the set can be configured to perform an error correction operation using parity data corresponding to data received from a respective media controller of the set.

In some embodiments, a first channel group of the plurality of channel groups can include a first set of PHY memory interfaces (e.g., the memory interfaces 224, 324, and/or 424 illustrated in FIGS. 2-4, respectively) of the plurality of PHY memory interfaces, a first set of media controllers (e.g., the media controllers 221, 321, and/or 421 illustrated in FIGS. 2-4, respectively) of the plurality of media controllers respectively coupled to the first set of media controllers, and a first logic gate (e.g., the logic gate 431 illustrated in FIG. 4) coupled between the first set of PHY memory interfaces and the first set of media controllers. Further, a second channel group of the plurality of channel groups can include a second set of PHY memory interfaces of the plurality of PHY memory interfaces (e.g., the memory interfaces 224, 324, and/or 424 illustrated in FIGS. 2-4, respectively), a second set of media controllers (e.g., the media controllers 221, 321, and/or 421 illustrated in FIGS. 2-4, respectively) of the plurality of media controllers respectively coupled to the second set of media controllers, and a second logic gate (e.g., the logic gate 431 illustrated in FIG. 4) coupled between the second set of PHY memory interfaces and the second set of media controllers.

FIG. 5 is a flow diagram of a method 570 for operating a memory controller having a cache architecture in accordance with a number of embodiments of the present disclosure. The methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 572, a plurality of read commands can be received respectively at a set of media controllers (e.g., the media controllers 221, 321, and/or 421 illustrated in FIGS. 2-4, respectively) coupled to a set of PHY memory interfaces (e.g., the memory interfaces 224, 324, and/or 424 illustrated in FIGS. 2-4, respectively) corresponding to a reliability, availability, and serviceability (RAS) channel (e.g., the channel group 328 and/or 428 illustrated in FIGS. 3 and 4, respectively).

At 574, the set of media controllers can be prevented from executing the plurality of read commands responsive to receiving, from at least one of the set of PHY memory interfaces, a first signal indicative of the at least one of the set of PHY memory interfaces being busy until a second signal indicative of the at least one of the set of PHY memory interfaces being no longer busy is received from the at least one of the set of PHY memory interfaces.

In some embodiments, the plurality of read commands can be executed by accessing, from memory devices (e.g., the memory devices 126, 226, 326, and/or 426 illustrated in FIGS. 1-4, respectively) coupled to the set of PHY memory interfaces via respective memory channels (e.g., the memory channels 125, 225, 325, and/or 425 illustrated in FIGS. 1-4, respectively), subsets of data corresponding to the RAS channel and that is a unit of read access. The memory devices can be accessed substantially simultaneously.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

receiving a plurality of read commands respectively at a set of media controllers coupled to a set of memory interfaces; and preventing the set of media controllers from executing the plurality of read commands responsive to determining that at least one of the set of memory interfaces is currently busy, and until determining that the at least one of the set of memory interfaces is no longer busy.

2. The method of claim 1, further comprising allowing the set of media controllers to execute the plurality of read commands responsive to determining that the set of memory interfaces are no longer busy.

3. The method of claim 1, further comprising substantially simultaneously executing the plurality of read commands via the set of media controllers.

4. The method of claim 1, further comprising preventing the set of media controllers from executing the plurality of read commands by preventing the set of media controllers from accessing memory devices coupled to the set of media controllers via the set of memory interfaces.

5. A memory controller, comprising:

a plurality of memory interfaces selectively couplable to a plurality of memory devices via a plurality of memory channels, wherein the plurality of memory channels are organized as a plurality of channel groups;

wherein each channel group of the plurality of channel groups comprises:

a respective set of memory interfaces of the plurality of memory interfaces; and a respective set of media controllers respectively coupled to the respective set of memory interfaces; and wherein the memory controller is configured to prevent each memory interface of the respective set of memory interfaces from accessing memory devices of a respective channel group in response to a determination that at least one memory interface of the respective set of memory interfaces is currently busy.

6. The memory controller of claim 5, wherein the memory controller is further configured to allow the respective set of memory interfaces to access the memory devices of the respective channel group in response to a determination that each memory interface of the respective set of memory interface are no longer busy.

7. The memory controller of claim 5, wherein at least one memory channel of the plurality of memory channels comprises one or more data mask inversion (DMI) pins.

8. The memory controller of claim 5, wherein at least one memory channel of the plurality of memory channels comprises one or more data (DQ) pins.

9. The memory controller of claim 5, wherein the memory controller is configured to perform a respective chip kill operation on data corresponding to each one of the plurality of channel groups independently.

10. The memory controller of claim 9, wherein the memory controller is configured to perform the respective chip kill operation on the fly.

11. The memory controller of claim 5, wherein the memory controller is further configured to convert data between plain text and cypher text forms.

12. The memory controller of claim 5, wherein at least one of the plurality of memory interfaces corresponds to a physical (PHY) memory interface.

13. A memory controller, comprising:

a plurality of memory interfaces respectively coupled to a plurality of memory channels that are organized as a plurality of channel groups; and a plurality of media controllers respectively coupled to the plurality of memory interfaces;

wherein each channel group of the plurality of channel groups further comprises:

a set of memory interfaces of the plurality of memory interfaces;

a set of media controllers respectively coupled to the set of media controllers; and a logic gate coupled between the set of memory interfaces and the set of media controllers, the logic gate configured to provide, to each media controller of the respective set, an output signal indicative of whether a respective memory interface is busy;

wherein the memory controller is configured to prevent the set of media controllers of a respective channel group from accessing memory devices coupled via a respective set of memory interfaces in response to receipt of a first signal from the logic gate indicating that at least one of the set of memory interfaces is currently busy.

14. The memory controller of claim 13, wherein a respective memory interface of the set of memory interfaces is configured to provide a respective third signal to the logic gate whether the respective memory interface of the set of memory interfaces is busy.

15. The memory controller of claim 14, wherein the logic gate is configured to provide the first signal to the set of media controllers in response to receipt of the respective third signal from the at least one of the set of memory interfaces.

16. The memory controller of claim 13, wherein the logic gate corresponds to an OR gate.

17. The memory controller of claim 13, wherein the memory controller is further configured to allow the set of memory interfaces to access the memory devices in response to receipt of a second signal from the logic gate indicating that each memory interface of the set of memory interfaces is no longer busy.

18. The memory controller of claim 13, wherein each channel group of the plurality of channel groups comprises an error correction code (ECC) component that is operated, by the memory controller, in association with accessing the memory devices corresponding to the respective channel group.

19. The memory controller of claim 13, wherein the memory controller is configured to operate the plurality of channel groups as independent respective reliability, availability, and serviceability (RAS) channels.

20. The memory controller of claim 13, wherein the memory controller is further configured to perform a cyclic redundancy check (CRC) operation on data received via the respective set of memory interfaces.

* * * * *